(12) United States Patent
Ward et al.

(10) Patent No.: US 7,210,540 B2
(45) Date of Patent: May 1, 2007

(54) TOOL RETAINING MECHANISM

(75) Inventors: Graeme Stanley Ward, Tanunda (AU); Thomas George Chapman, St. Agnes (AU)

(73) Assignee: Osmundson Australia Pty Ltd, Queensland (AU)

( * ) Notice: Subject to any disclaimer, the term of this patent is extended or adjusted under 35 U.S.C. 154(b) by 0 days.

(21) Appl. No.: 11/271,466

(22) Filed: Nov. 10, 2005

(65) Prior Publication Data
US 2006/0083581 A1    Apr. 20, 2006

Related U.S. Application Data

(63) Continuation of application No. 10/414,373, filed on Apr. 16, 2003, now abandoned.

(30) Foreign Application Priority Data

Apr. 23, 2002   (AU) .................................. PS1865
Jul. 31, 2002    (AU) ............................ 2002950488

(51) Int. Cl.
*E02F 9/28*    (2006.01)

(52) U.S. Cl. ................... 172/772.5; 172/772; 172/753; 172/762; 172/769; 37/456; 37/458; 37/459; 403/317; 403/318; 403/319

(58) Field of Classification Search ................. 37/455, 37/456, 458, 459; 172/772, 772.5, 753, 762, 172/763, 764, 769; 403/317, 318, 319
See application file for complete search history.

(56) References Cited

U.S. PATENT DOCUMENTS

| | | | | | |
|---|---|---|---|---|---|
| 3,268,260 | A | * | 8/1966 | Snipe | 403/355 |
| 3,826,024 | A | * | 7/1974 | Petersen | 37/458 |
| 3,952,433 | A | * | 4/1976 | Heinold et al. | 37/457 |
| 4,505,058 | A | * | 3/1985 | Peterson | 37/459 |
| 5,177,886 | A | * | 1/1993 | Klett | 37/456 |
| 5,711,378 | A | * | 1/1998 | Yeager | 172/762 |
| 6,289,996 | B1 | * | 9/2001 | Parish | 172/762 |

* cited by examiner

*Primary Examiner*—Thomas B. Will
*Assistant Examiner*—Michael P. Ferguson
(74) *Attorney, Agent, or Firm*—Klauber & Jackson

(57) ABSTRACT

A securing arrangement for a tool (7) of an agricultural tillage implement of a type having a tapered interconnection between a socket (5) on the tool and an adaptor piece (3) adapted for mounting onto a tine (1) of the tillage implement. The adaptor piece (3) has a recess (9) which can be an aperture or a pair of transverse arcuate slots (31) for receiving a retaining pin (11). The socket (5) on the tool has notches (15) on its opposed sides and a portion (13) on the retaining pin in use engages into at least one of the notches (15) to prevent disengagement of the socket (5) from the adaptor piece (3). The adaptor piece can be integral with the tine.

3 Claims, 5 Drawing Sheets

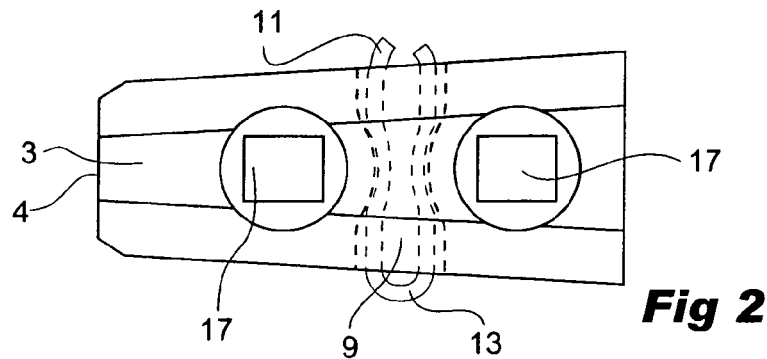
*Fig 2*
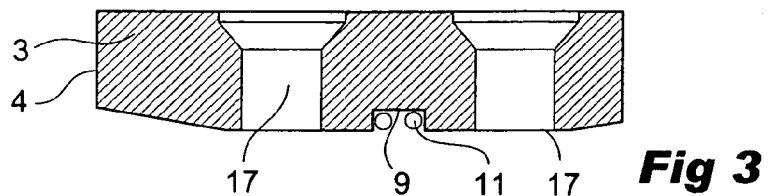
*Fig 3*
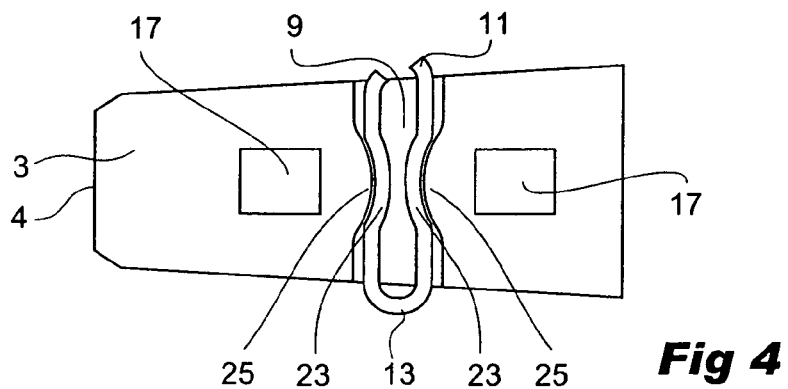
*Fig 4*
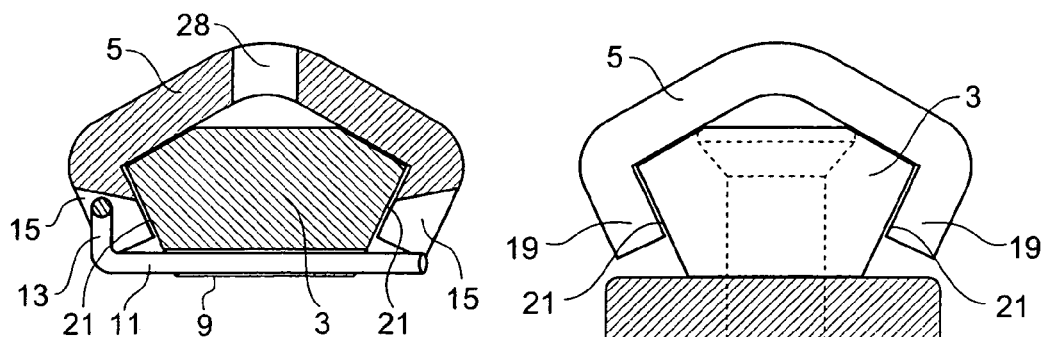
*Fig 5*          *Fig 6*

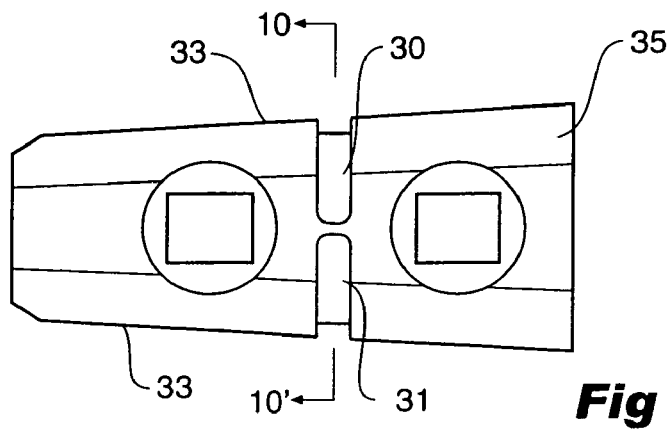
Fig 8
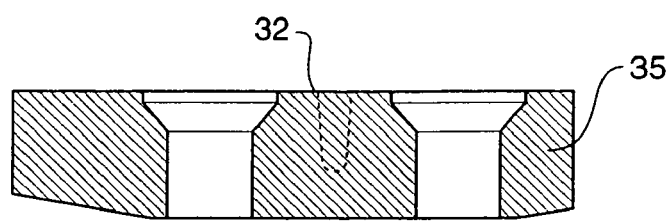
Fig 9
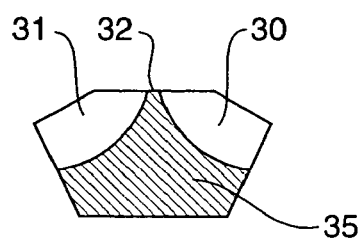
Fig 10
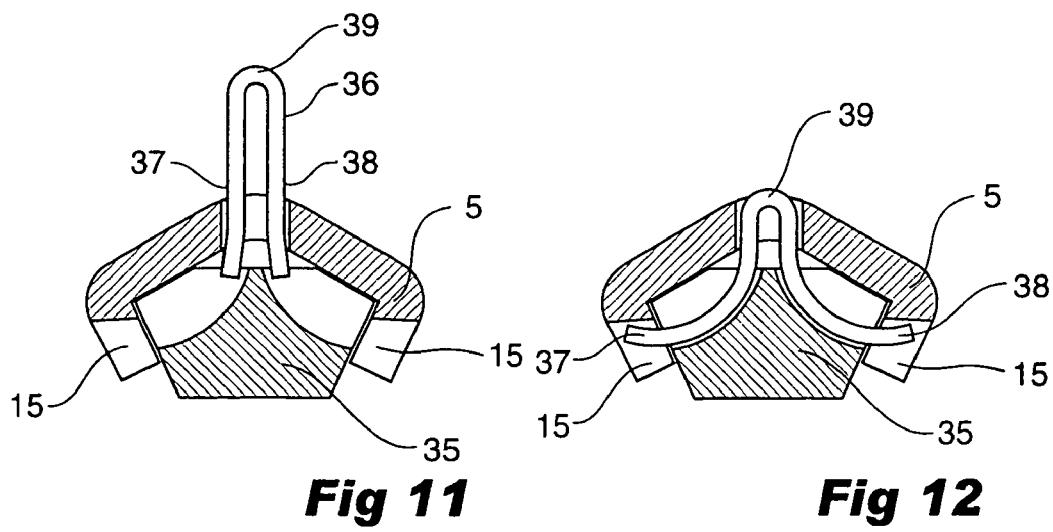
Fig 11      Fig 12

TOOL RETAINING MECHANISM

REFERENCE TO RELATED PATENT APPLICATIONS

The present patent application is a continuation application of U.S. Ser. No. 10/414,373, filed Apr. 16, 2003 now abandoned and entitled "TOOL RETAINING MECHANISM" and priority to that parent application is hereby claimed.

FIELD OF INVENTION

This invention relates to an agricultural implement and more particularly to a mechanism for retaining a tool on an agricultural implement.

BACKGROUND TO THE INVENTION

Interchangeable tools are used on agricultural ground working implements depending upon the type of ground to be worked and the reason for working the ground. In one arrangement these interchangeable tools have a socket on the tool and a tapered adaptor piece on the tine of the ground working implement and the tool is retained on the adaptor piece by the socket fitting onto the tapered adaptor piece. Such a tapered connection arrangement provides a positive grip for the tool onto the tine and is usually sufficient to hold the tool on but as it is a taper arrangement a slight movement of the tool off the adaptor piece can easily disengage the tool. Such an effect can occur when recoil of the tine occurs and hence it is necessary to have some method to prevent complete disengagement of the tool from the adaptor piece while still allowing for manufacturing tolerances of the adaptor piece and the socket of the tool.

Another object is to produce an arrangement for holding tools onto tines which is simpler than existing arrangements and has less parts or to at least provide the public with a useful alternative.

A further problem exists that as tools are formed from thicker material to give greater wear life the springiness of the tapered socket portion hence the ability to grip on to the adaptor piece is reduced. The present inventor has found ways by which the grip of the socket on to the adaptor piece can be improved.

BRIEF DESCRIPTION OF THE INVENTION

In one form therefore, although this may not be the only or broadest form the invention is said to reside in a securing arrangement for a tool of an agricultural tillage implement of a type having a tapered interconnection between a socket on the tool and an adaptor piece adapted for mounting onto the tine of the tillage implement, the adaptor piece having a recess for receiving a retaining pin and the socket on the tool having notches on its opposed sides, the notches in use substantially aligning with the recess in the adaptor piece, and a portion on the retaining pin in use engaging into at least one of the notches to prevent disengagement of the socket from the adaptor piece.

It will be seen that by this arrangement the socket is retained on the adaptor piece which is in turn mounted on the tine but if the taper disengages then the retaining pin received in the recess in the adaptor piece will engage against the sides of the notch in the tool and prevent the tool from dropping off the tapered connection arrangement. Re-engagement of the tool into the ground will again push the socket firmly on to the adaptor piece.

Preferably the recess includes a location arrangement and the retaining pin includes a location device to engage with the retaining arrangement to prevent the retaining pin from dropping out of the recess. This may be provided by a bulge in the sides of the recess and a kink in the pin which engages against the bulge. Other co-acting arrangements may also be used.

In one preferred embodiment the retaining pin is a U-shaped clip. Such a clip may include a head which engages into the notch thereby becoming the portion which engages into the notch to prevent disengagement of the socket from the adaptor piece.

Preferably the recess in the adaptor piece is a recess in a lower side of the adaptor piece which when an adaptor piece is fastened onto the tine provides a aperture into and through which the retaining pin such as the U-shaped spring clip can engage.

In an alternative arrangement the recess may be a pair of transverse arcuate slots extending from the top of the adaptor piece to the sides of the adaptor piece. In use when the socket is mounted onto the adaptor piece the aperture on the upper surface of the socket aligns with the pair of transverse arcuate slots extending from the top of the adaptor piece.

In this embodiment the retaining clip may be a U-shaped wire pin which is driven into an aperture in the upper surface of the socket and spreads in the transverse arcuate slots to be retained in the recess. When the U-shaped wire pin is driven in the terminal portions of the U-shaped wire pin extend into the respective notches to prevent disengagement of the tool from the adaptor piece.

They may be used for instance bolts to retain the adaptor piece to the tine although in an alternative embodiment the adaptor may be part of the tine and the recess may be a transverse aperture in the tine or a pair of arcuate slots in the upper surface of the tine.

The tool may be a point, a chisel or a winged ground engaging implement or any other convenient shape as required for the particular ground working application.

It may be particularly noted that the notch may be some what larger than the head of the retaining pin or the terminal portions of the u-shaped wire pin because these portions are not required to prevent small movement of the socket with respect to the adaptor piece but only movement sufficient to actually disengagement the tool from the adaptor piece. The size of the notch also allows for manufacturing tolerances between the socket and the adaptor piece. The taper on the sides of the adaptor piece or on the tine may be an industry standard 8 degree taper.

It may be also noted that the use of the notch in the sides of the socket portion results in the socket having in effect two shorter side portions and applicant has found that with the thicker material of construction of the socket portion the shorter side portions become more springy than they would be without the notch and give them an ability to grip onto the adaptor piece better. The aperture in the upper surface of the socket portion also assists in providing the desired springiness or resilience to enable the tapered socket to remain on the adaptor piece.

BRIEF DESCRIPTION OF THE DRAWINGS

This then generally describes the invention but to assist with understanding reference will now be made to the accompanying drawings which show preferred embodiments of the invention.

In the drawings:

FIG. 2 shows a top view of the adaptor piece of the embodiment shown in FIG. 1;

FIG. 3 shows a longitudinal cross-sectional view of the adaptor piece of the embodiment shown in FIG. 1;

FIG. 4 shows an underside view of the adaptor piece of the embodiment shown in FIG. 1;

FIG. 5 shows a transverse cross-section of the adaptor piece with a socket mounted on it in the region of the notches of the embodiment shown in FIG. 1;

FIG. 6 shows an end view of the socket and adaptor piece of the embodiment shown in FIG. 1 mounted on a tine;

FIG. 8 shows a top view of the adaptor piece for the embodiment shown in FIG. 7;

FIG. 9 shows a longitudinal cross-sectional view of the adaptor piece for the embodiment shown in FIG. 7;

FIG. 10 shows a transverse cross section along the line 10–10' in FIG. 8 of the adaptor piece for the embodiment shown in FIG. 7;

FIG. 11 shows a transverse cross-section of the adaptor piece of FIG. 7 with a socket mounted on it in the region of the notches and with the retaining pin about to be driven in;

FIG. 12 shows the view of FIG. 11 with the retainer pin driven in; and

DESCRIPTION OF PREFERRED EMBODIMENTS

Figure 1:
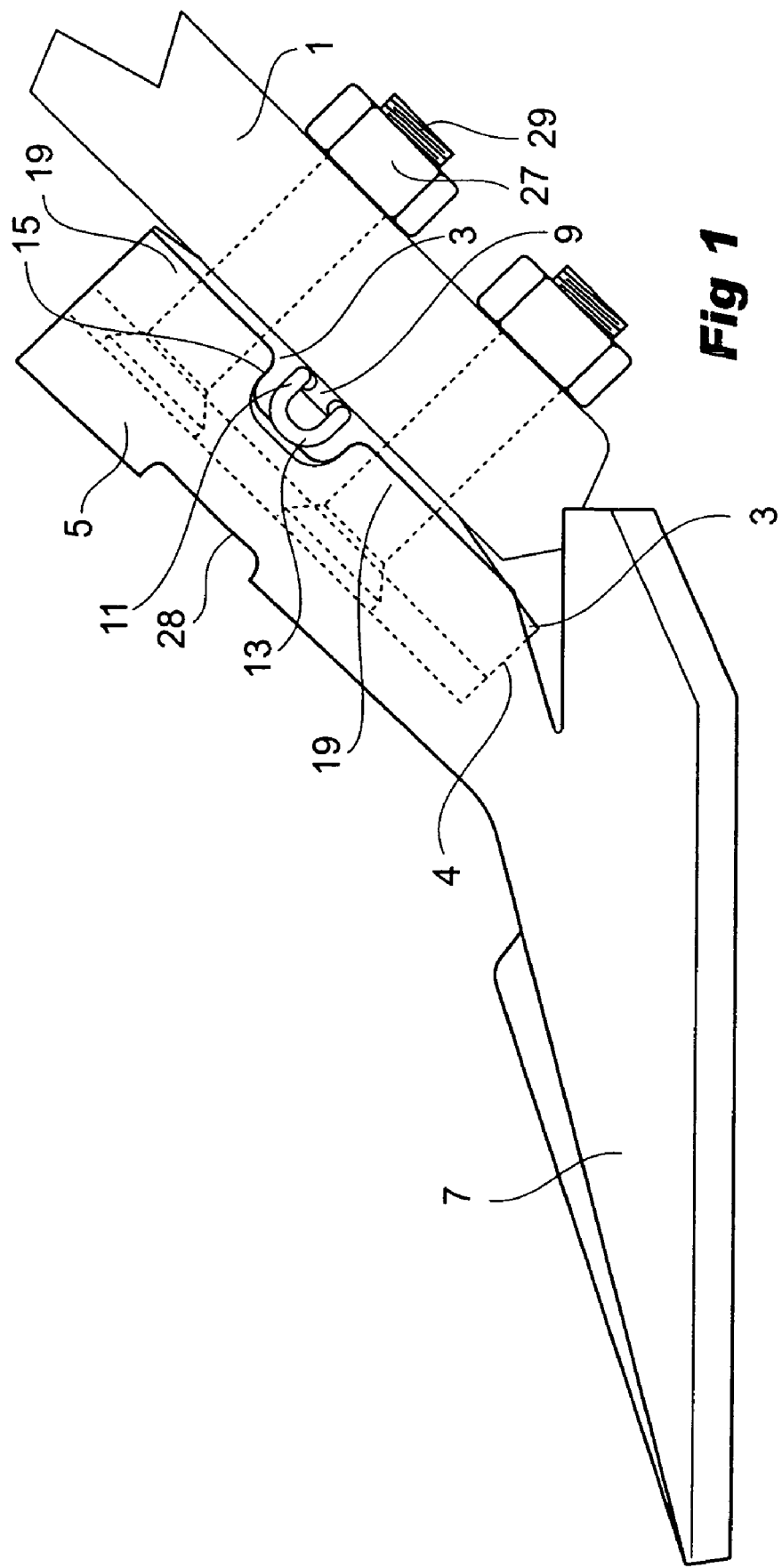
FIG. 1 shows a side view of a tool mounted onto an adaptor piece on a tine according to one embodiment of the invention.
Figure 7:
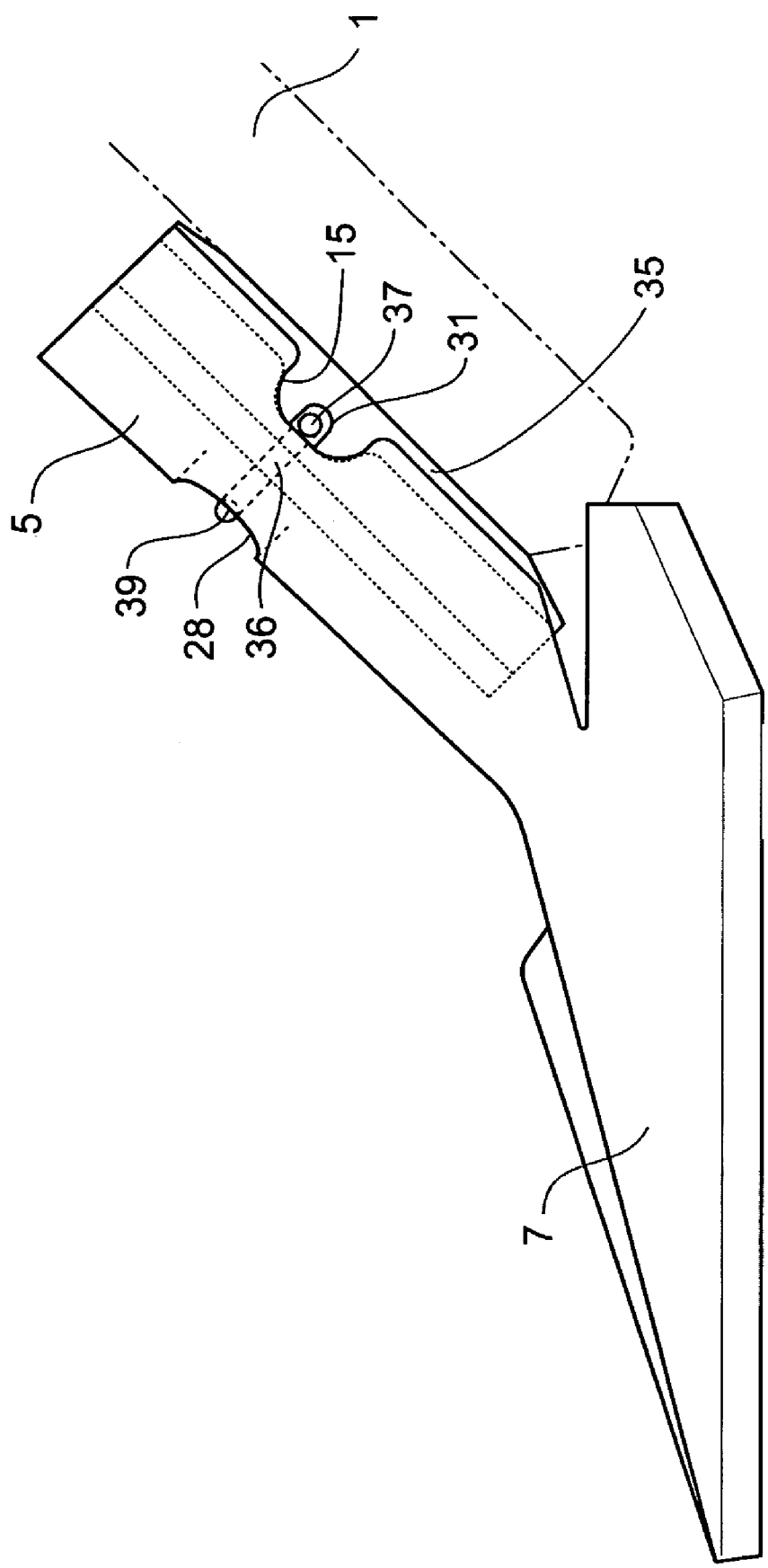
FIG. 7 shows a side view of a tool mounted onto an adaptor piece on a tine according to an alternative embodiment of the invention.

Now looking more closely at the drawings and in particular the first embodiment shown in FIGS. 1 to 6 it will be seen that the tine 1 has an adaptor piece 3 mounted onto it and the adaptor piece has a taper which can be seen more particularly in FIGS. 2 and 4 onto which a tapered socket 5 is mounted. The tapered socket 5 is integral with a ground working tool 7. The adaptor piece is mounted on the tine 1 so that the end 4 is further down the tine and the socket 5 joins onto it from that end.

The integral tool 7 and socket 5 have a notch 15 on each side and a longitudinal slot 28 substantially along its centre line. The notches 15 have a dual purpose. First they allow the engagement of a retaining pin as is discussed below to prevent disengagement of the socket 5 from the adaptor piece 3 and second they enable the sides of the socket to more elastically to grip the adaptor piece. The slot 28 is provided both to enable the sides of the socket to be more elastically to grip the adaptor piece and to provide a purchase point for a mounting tool such as an air hammer to drive the tool onto the adaptor piece. Where a tool is provided with wear enhanced edges it is desirable that a hammer is not used on those edges to drive the tool onto the adaptor piece.

Underneath the adaptor piece 3 and in use abutting against the tine 1 is a recess 9 into which a U shaped location clip 11 fits. The location clip 11 has a bent up head 13 which engages into the notch 15 in the side of the socket 5.

It will be noted that in the normal fitting position the head 13 of the retaining pin 11 does not engage against the sides of the notch 15 but only when the tine has moved in relation to the adaptor piece does the head engaging against the sides of the notch 15 prevent the tool 7 from coming off completely.

The location clip 11 has bends 23 where it passes through the recess 9 and the recess 9 has corresponding bulges in its sides 25 which act as locators to prevent the location clip 11 from coming out of the recess 9.

The adaptor piece 3 is bolted onto the tine 1 with bolts 29 and nuts 27 through bolt holes 17 in the adaptor piece.

As discussed earlier the side portions 19 of the socket 5 each side of the recess 15 engage against the sides 21 of the adaptor piece and assist with the retaining of the socket onto the adaptor piece. The notches 15 on each side of the socket 5 enable these portions 19 to have a tighter fit against the portion 21 of the adaptor piece than would be possible if the notches were not present.

The adaptor piece may be cast or forged steel and the location clip 11 may be made from spring steel or similar material.

A second embodiment of the invention is shown in FIGS. 7 to 12. In the illustrations of this embodiment the same reference numerals are used for the same components as shown in FIGS. 1 to 6.

In the second embodiment the recess in the adaptor piece 35 is formed as a pair of arcuate transverse slots 30, 31 which extend from the upper surface 32 of the adaptor piece 35 to the sides 33 of the adaptor piece. In this embodiment the slot 28 in the upper surface of the socket 5 aligns with the arcuate transverse slots 30, 31 on the upper surface 32 of the adaptor piece 35 when the socket is driven onto the adaptor piece the correct amount. The retainer pin 36 which is substantially U-shaped or hairpin shaped before insertion is driven through the slot 28 into the transverse slots 30, 31 and as it is driven it the legs 37, 38 plastically deform and spread sideways in opposite directions by reaction with the arcuate walls of the slots 30, 31. The deformed retainer pin 36 remains deformed and cannot fall out of the recess.

The ends of the arms 37, 38 of the pin 36 extend out of the transverse slots 30, 31 when inserted and are received in the notches 15 in the sides of the socket 5. The ends of the arms 37, 38 of the pin 36 along with the upper end 39 of the pin 36 all act to prevent the socket 5 coming off the adaptor piece 35 if the taper connection between them as discussed above is caused to release during operation of the ground working implement. Hence it can be seen that the pin does not directly stop the taper connection from releasing but once it is released by shaking or sudden jarring of the tine, for instance, then the various portions of the pin engaging against the socket prevents the tool coming off the adaptor piece.

To remove the pin for changing the tool on the tine a spike or hook may be engaged under the head 39 of the pin 36 and the pin is pulled up. The pin again plastically deforms to enable it to be removed.

Figure 13:
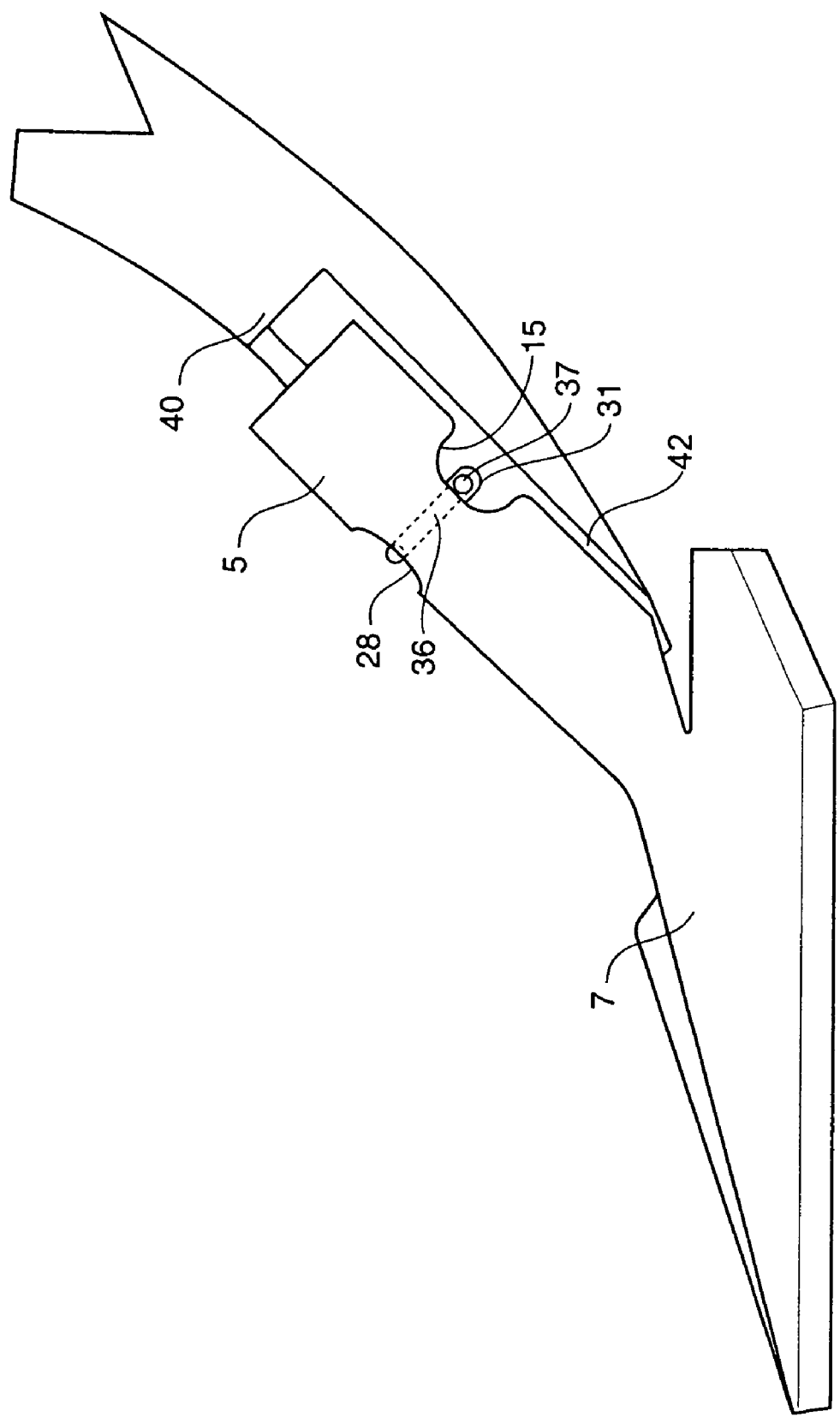
FIG. 13 shows a side view of a tool mounted onto a tine with an integral adaptor piece according to an alternative embodiment of the invention.

FIG. 13 shows a side view of a tool mounted onto a tine with an integral adaptor piece according to an alternative embodiment of the invention. In the illustration of this embodiment the same reference numerals are used for the same components as shown in FIGS. 7 to 12.

In this embodiment the tine 40 has a tapered terminal portion 42 and it is onto this tapered portion 42 that the socket 5 of the tool 7 is mounted. When tool 7 is mounted onto the tapered portion 42 to the correct amount the aperture 28 on the socket 5 is aligned with the arcuate recesses 31 and the pin 36 can be driven into the arcuate recess so that it plastically deforms and its terminal portions 37 extend into the notches 15 in the sides of the socket 5 to assist with retention of the tool onto the tine.

Throughout this specification various indications have been given as to the scope of this invention but the invention is not limited to any one of these but may reside in two or more of these combined together. The examples are given for illustration only and not for limitation.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The claims defining the invention are as follows:

1. An agricultural tillage implement comprising a tine, an adaptor piece mounted and secured onto the tine, a tool received on the adaptor piece and a securing arrangement comprising a retaining pin to retain the tool onto the adaptor piece, the tool comprising a socket and the adaptor piece being tapered to be received in the socket, wherein the socket has an upper surface facing upwardly with respect to a top surface of the adaptor piece, the adaptor piece comprising a pair of concave transverse arcuate slots extending from the top surface of the adaptor piece to adjacent opposed sides of the adaptor piece for receiving the retaining pin, the socket of the tool comprising an aperture on said upper surface and notches aligned with the aperture in opposed sides of the socket, the notches in use substantially aligning with the arcuate slots in the adaptor piece, when the adaptor piece is received in the socket, and a portion of the retaining pin in use engaging the aperture and the notches to prevent disengagement of the socket from the adaptor piece.

2. An agricultural tillage implement as in claim 1 wherein the retaining pin is a U-shaped wire pin which in use is driven into the aperture in the upper surface of the socket and spreads in the transverse arcuate slots to be retained therein and terminal portions of the U-shaped wire pin extend into the respective notches to prevent disengagement of the tool from the adaptor piece.

3. An agricultural tillage implement as in claim 1 wherein the adaptor piece is integral with the tine and the pair of arcuate slots are formed in an upper surface of the tine.

* * * * *